United States Patent
Doerr et al.

(10) Patent No.: US 12,292,496 B2
(45) Date of Patent: May 6, 2025

(54) METHOD AND DEVICE FOR DETERMINING AN ANGLE OF A TARGET OBJECT

(71) Applicant: Aptiv Technologies AG, Schaffhausen (CH)

(72) Inventors: Wolfgang Doerr, Wiehl (DE); Uri Iurgel, Wuppertal (DE); Stephanie Lessmann, Erkrath (DE)

(73) Assignee: Aptiv Technologies AG, Schaffhausen (CH)

( * ) Notice: Subject to any disclaimer, the term of this patent is extended or adjusted under 35 U.S.C. 154(b) by 272 days.

(21) Appl. No.: 17/650,514

(22) Filed: Feb. 9, 2022

(65) Prior Publication Data

US 2022/0260701 A1 Aug. 18, 2022

(30) Foreign Application Priority Data

Feb. 17, 2021 (EP) ..................................... 21157676

(51) Int. Cl.
*G01S 13/42* (2006.01)
*G01S 7/35* (2006.01)
*G01S 13/931* (2020.01)

(52) U.S. Cl.
CPC .............. *G01S 13/42* (2013.01); *G01S 7/356* (2021.05); *G01S 13/931* (2013.01)

(58) Field of Classification Search
CPC .................................................... G01S 13/931
See application file for complete search history.

(56) References Cited

U.S. PATENT DOCUMENTS

| 8,665,144 B2 * | 3/2014 | Venkatachalam ..... G01S 13/951 |
| | | 342/188 |
| 10,332,265 B1 * | 6/2019 | Hoffmann ............... G06V 20/64 |
| 2019/0353780 A1 * | 11/2019 | Statnikov .............. G01S 13/931 |

FOREIGN PATENT DOCUMENTS

| CN | 111157995 A | 5/2020 |
| CN | 111487599 A * | 8/2020 ............... G01S 7/41 |

(Continued)

OTHER PUBLICATIONS

Dinger et al., Digital Beamforming in a Compact 20-32 MHz Radar, 2002, IEEE, N/A, p. 150 (Year: 2018).*

(Continued)

*Primary Examiner* — Vladimir Magloire
*Assistant Examiner* — Eric K Hodac
(74) *Attorney, Agent, or Firm* — Harness, Dickey & Pierce, P.L.C.

(57) ABSTRACT

A method is provided for estimating an angle of an object with respect to a vehicle. A transformation of reflected radar signals is calculated, wherein the result of the transformation depends on a range with respect to the vehicle. A long beam vector is generated for respective range bins provided by the transformation by rearranging the result of the transformation such that the respective long beam vector comprises elements of the transformation from radar all receiver elements for each range bin. A reference vector is calculated for each range bin based on a signal model which depends on the motion of the target object relative to the vehicle and which is parameterized regarding the angle of the target object. The long beam vector and the reference vector are correlated, and the angle of the target object is determined based on the correlation result.

23 Claims, 5 Drawing Sheets

(56) References Cited

FOREIGN PATENT DOCUMENTS

| | | |
|---|---|---|
| EP | 3045934 A1 | 7/2016 |
| JP | 4722574 B2 | 7/2011 |
| WO | WO-2022139843 A1 * | 6/2022 ........... G01S 13/584 |

OTHER PUBLICATIONS

Towsley et al., Correlation Angles and Inner Products: Application to a Problem from Physics, Oct. 17, 2011, ISRN Applied Mathematics, 2011, p. 1 (Year: 2012).*

"Extended European Search Report", EP Application No. 21157676.4, Jul. 1, 2021, 9 pages.

Dinger, et al., "Digital Beamforming in a Compact 20-32 MHz Radar", May 2000, pp. 149-152.

Vasanelli, et al., "Calibration and Direction-of-Arrival Estimation of Millimeter-Wave Radars: A Practical Introduction", IEEE Antennas & Propagation Magazine, Dec. 2020, pp. 34-45.

* cited by examiner

METHOD AND DEVICE FOR DETERMINING AN ANGLE OF A TARGET OBJECT

CROSS-REFERENCE OF RELATED APPLICATION

This application claims priority to European Patent Application Number 21157676.4, filed Feb. 17, 2021, the disclosure of which is hereby incorporated by reference in its entirety herein.

BACKGROUND

Driver assistance systems and autonomous driving rely on a reliable perception of the environment of a vehicle. If objects in the environment of the vehicle are detected, angles of these objects with respect to the host vehicle, i.e., azimuth and elevation angles with respect to a longitudinal axis of the vehicle, are often important parameters for a proper performance of assistant systems. For autonomous driving, a reliable and precise angle determination is even essential.

In order to determine azimuth and/or elevation angles of objects within the environment of the vehicle, Lidar systems may be used. Lidar systems provide a high angular resolution and accuracy because they scan the instrumental field of view of the system with a sharp beam. However, Lidar systems are expensive, e.g., in comparison to radar systems. Therefore, it is desirable to perform the angle determination of objects in the environment of the host vehicle based on radar systems only without the need for an expensive Lidar system.

Angle estimation based on radar systems, however, is an important process that determines the system performance. Existing methods for angle estimation based on radar systems are e.g., Fourier transform techniques or an iterative adaptive approach (IAA), amongst others. For improving the angular resolution, however, the cost for the required radar system may strongly increase, because a higher number of antennas and therefore a higher package size are required. Moreover, an increased package size for a radar system may prevent the installation of such a system in certain vehicles, e.g., in the region of the bumper. In addition, approaches like IAA require a high computational effort.

Artefacts of the used antenna configuration, the vehicle integration and the signal processing cause a broadened response of the "true" angle in angular responses of signals reflected by the environment of the vehicle, and additionally unwanted sidelobes. That is, there might be some ambiguity regarding the correct determination of the angle and a limited resolution for separating multiple target objects when using the known technologies. Similar issues may occur in Doppler processing containing a broadened response and sidelobe problems. However, these effects are different from those occurring during antenna processing so that they might compensate each other.

Accordingly, there is a need to provide a method and a device which are able to accurately determine an angle of a target object with respect to a host vehicle and to resolve multiple target objects by using an inexpensive radar system.

SUMMARY

The present disclosure relates to a method and a device for estimating an angle of a target object with respect to a host vehicle by using a radar system of the host vehicle. More specifically, the present disclosure provides a computer implemented method, a computer system, and a non-transitory computer readable medium having instructions that, when executed, perform techniques according to the claims, the description, and the drawings.

In one aspect, the present disclosure is directed at a computer implemented method for estimating an angle of a target object with respect to a host vehicle by using a radar system of the host vehicle. The radar system includes at least one radar transmit element adapted to send a radar signal towards the target object, and a plurality of antenna receiver elements, or a plurality of radar transmit elements and at least one antenna receiver element, each antenna receiver element being adapted to receive radar signals reflected by the target object. According to the method, a transformation of the reflected signals is calculated, wherein a result of the transformation depends on a range with respect to the host vehicle via a processing unit of the host vehicle. A long beam vector is generated for each of a set of range bins provided by the transformation via the processing unit by rearranging the result of the transformation such that the respective long beam vector comprises elements of the transformation from all receiver elements for the respective range bin. Via the processing unit, a reference vector is calculated for each of the set of range bins based on a signal model which depends on the motion of the target object relative to the radar system and which is parameterized regarding the angle of the target object. The long beam vector and the reference vector are correlated via the processing unit for a predefined range of angles. Finally, the angle of the target object is determined based on the correlation result via the processing unit.

The angle with respect to the host vehicle may be defined with respect to a longitudinal axis of the host vehicle, i.e., with respect to a driving direction of the host vehicle if a steering angle is zero. Furthermore, the angle may be an azimuth angle defined in a plane parallel to the ground on which the vehicle is currently driving, wherein an origin of a coordinate system may be located at the antenna receiver elements of the radar system in order to define the azimuth angle. A vehicle coordinate system may also be used. Additionally, or alternatively, an elevation angle may be considered which is defined in a plane perpendicular to the plane in which the azimuth angle is defined and with respect to the same origin of the coordinate system. For the estimation of the azimuth and/or elevation angles, the transmit and receive antennas may form a virtual array which extends in the azimuth and/or elevation plane and whose elements are not located at identical azimuth and/or elevation angles.

Information regarding the relative motion may include a range rate of the target object, i.e., a temporal change of the distance between the target object and the host vehicle. Antennas for transmitting and receiving radar signals may include a plurality of physically separate antenna devices and/or a virtual plurality of antennas which may be provided by a single physical device, and which may be separated virtually by mechanical and/or electronic technologies. The number of transmit antennas and the number receiver antennas has to be selected such that the product of these numbers is at least two.

The transformation of the reflected signals regarding the range may be a one-dimensional Fourier transform which provides a transformation result as a function of range bins, i.e., discretized range steps. Usually, when performing a Fourier transform of a time dependent signal numerically, this transform provides complex values as a function of discretized frequencies, i.e., frequency bins. However, an alternative to the Fourier transform may be used for the transformation of the reflected signals regarding the range, e.g., other correlation procedures.

For detecting an environment of a host vehicle, the radar signal sent by the radar transmit element may have a frequency modulated continuous wave (FMCW) waveform which is usually referred to as a chirp. That is, the sent radar signal is frequency modulated on a fast time scale t within a so-called chirp period T. The transformation of the reflected signals regarding the range may therefore be performed on this fast time scale providing transformation values depending on discretized range steps or range bins.

Usually, a further Fourier transform regarding a Doppler frequency is performed for the reflected chirp radar signals on a slower time scale which usually results in a so-called range-Doppler spectrum. However, the method according to the disclosure differs from this standard way of processing reflected chirp radar signals in that the first transformation regarding the range is performed only before the further method steps follow. Instead of the second Fourier transform, the long beam vector is generated as a rearrangement of the result of the transformation and includes information over all receiver elements and chirps for the respective range bin.

In addition, the reference vector is calculated based on a signal model, wherein the reference vector includes the same dimension or number of elements as the long beam vector. The correlation of the beam vector and the reference vector is performed by using known correlation procedures, e.g., by calculating an inner product as in the common discrete Fourier transform, as will be described below. The angle of the target object with respect e.g., to the longitudinal axis of the host vehicle, i.e., the azimuth angle and/or the elevation angle, is directly determined based on the correlation because the signal model includes the respective angle as a parameter. For example, the angle may be varied over a predefined angle range in predefined steps, and for each step the respective result may be calculated for the correlation of the long beam vector and the reference vector.

In comparison to the angle estimation known from the background art, i.e., based on Fourier transform techniques or based on an iterative adaptive approach (IAA), the method according to the disclosure provides an angle estimation having suppressed sidelobes and a reduced width of a peak at the angle to be determined. Therefore, ambiguities regarding the angle estimation are strongly reduced by the method according to the disclosure, and in summary, the accuracy of the angle estimation is improved without significantly increasing the computational effort required or the cost for the required hardware. The improved accuracy of the angle estimation also enhances the ability to resolve multiple target objects.

The method according to the disclosure is performed for each range bin separately, i.e., for one range bin after the other. In order to reduce the computational time required, a region of interest for the range bins, i.e., a subset of all available range bins, may be predefined. Accordingly, the method may be performed for the subset of the range bins or for subsets of other parameters, e.g., azimuth angle or elevation angle, only.

The method may comprise one or more of the following features:

The transformation of the reflected signals may include a Fourier transform. The correlation of the long beam vector and the reference vector may include calculating an inner product of the long beam vector and the reference vector. The angle of the target object may be identified by finding at least one maximum of the correlation of the long beam vector and the reference vector.

A region of interest may be defined for the range of angles, and the long beam vector and the reference vector may be correlated for the region of interest only. An additional angle finding procedure may be combined with the correlation of the long beam vector and the reference vector in order to determine the angle. The additional angle finding procedure may be based on an iterative adaptive approach.

The motion of the target object relative to the radar system may be measured by an additional detection unit installed in the host vehicle. Alternatively, information regarding the motion of the target object relative to the radar system may be derived from former measurements which have been performed via the radar system.

According to an embodiment, the transformation of the reflected signals may include a Fourier transform. In this case, the transformation may require a low computational effort.

Furthermore, the correlation of the long beam vector and the reference vector may include calculating an inner product of the long beam vector and the reference vector. This correlation procedure is a straightforward means for performing the correlation and requires a low mathematical and computational effort. For example, for calculating the inner product each element of the long beam vector may be multiplied by the corresponding element of the reference vector, and the correlation result may be simply the sum over all of these multiplications or products.

The angle of the target object may be identified by finding at least one maximum of the correlation of the long beam vector and the reference vector. Because it turned out that the sidelobes in the correlation results as a function of the angle are strongly suppressed and the width of the peaks within the correlation result is reduced, as mentioned above, a straightforward maximum finding procedure may be sufficient in order to determine the proper angle of the target object from the correlation result. This may again reduce the computational requirements of the method.

In addition, a region of interest may be defined for the range of angles, and the long beam vector and the reference vector may be correlated for the region of interest only. As mentioned above, the reference vector is calculated depending on the angle as a parameter, wherein the angle is varied over the predefined angle range, e.g., in steps of one degree. If a special region of interest is known or defined for the angle to be estimated, the angle may be varied over this region of interest only when calculating the reference vector. Therefore, the computational time required for calculating the reference vectors for the different angles may be reduced. The region of interest may be known from measurements provided by further systems of the vehicle or may be predefined based on the construction of the vehicle.

According to a further embodiment, an additional angle finding procedure may be combined with the correlation of the long beam vector and the reference vector in order to determine the angle. In detail, the additional angle finding procedure may be based on an iterative adaptive approach (IAA). It turned out that the method described above may be compatible to be combined with other frequency estimation concepts, e.g., the iterative adaptive approach. It may also be compatible with subsequent estimation processes requiring complex valued responses, e.g., azimuth elevation estimation as a separate process. The additional angle finding procedure may further increase the resolution of the angle estimation by further suppressing sidelobes and reducing the width of peaks in the correlation result depending on the angle as a parameter. The iterative adaptive approach may focus on certain angle ranges and provide lower sidelobes and a lower peak width.

The motion of the target object relative to the radar system may be measured by an additional detection unit installed in the host vehicle. Generally, the method requires an independent determination of the relative motion of the target object. At least one parameter which relates to the relative motion of the target object is necessary for applying the signal model being required for calculating the reference vector. If the relative motion of the target object is measured by an additional detection unit of the vehicle, e.g., as part of a further component of a driver assistant system, the reliability, when calculating the reference vector, may be improved because the information regarding the relative motion is provided by an independent measurement. On the other hand, if information regarding the relative motion is derived from former measurements of the radar system which is also used by the method, no additional hardware may be required for providing the information regarding the relative motion. In addition, a plurality of relative motions may be considered which may extend a parameter vector of the signal vector. This may lead to an increase in the dimensionality of the response in order to enable subsequent processes which may handle multiple hypotheses.

In another aspect, the present disclosure is directed at a device for estimating an angle of a target object with respect to a host vehicle. The device comprises a radar system which is installed in the host vehicle, and which includes at least one radar transmit element adapted to send a radar signal towards the target object, and a plurality of antenna receiver elements, or a plurality of radar transmit elements and at least one antenna receiver element, wherein each antenna receiver element is adapted to receive radar signals reflected by the target object. The device further comprises a processing unit and which is configured to calculate a transformation of the reflected signals, wherein a result of the transformation depends on a range with respect to the host vehicle, to generate a long beam vector for each of a set of range bins provided by the transformation by rearranging the result of the transformation such that the respective long beam vector comprises elements of the transformation from all receiver elements for the respective range bin, to calculate a reference vector for each of the set of range bins based on a signal model which depends on the motion of the target object relative to the radar system and which is parameterized regarding the angle of the target object, to correlate the long beam vector and the reference vector for a predefined range of angles, and to determine the angle of the target object based on the correlation result.

As used herein, the terms processing module and processing unit may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module or unit may include memory (shared, dedicated, or group) that stores code executed by the processor.

In summary, the device according to the disclosure includes a radar system and a processing unit which are configured to perform the steps as described above for the corresponding method. Therefore, the benefits, the advantages and the disclosure as described above for the method are also valid for the device according to the disclosure. The processing unit may be installed in the host vehicle, but as an alternative, it may also by an external unit which may be related e.g., to a cloud system.

The processing unit may further be configured to perform an additional angle finding procedure based on an iterative adaptive approach. The device may further comprise an additional detection unit which is configured to measure the motion of the target object relative to the radar system. Alternatively, the processing unit may be further configured to derive information regarding the motion of the target object relative to the radar system from former measurements which have been performed via the radar system.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
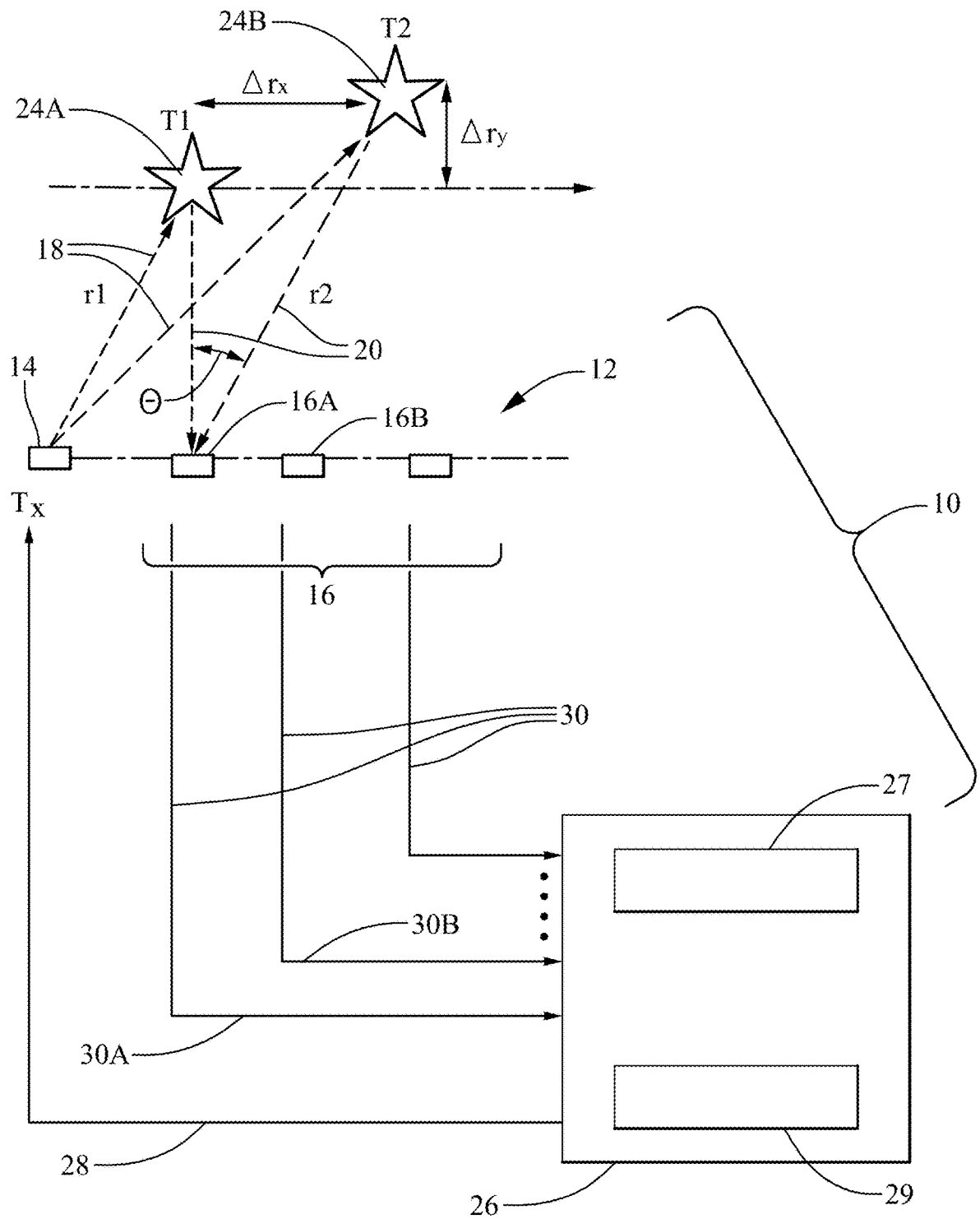
FIG. 1 depicts a diagram of a radar system used by the method according to the disclosure.

FIG. 1 depicts a vehicle-based radar system 10. The system 10 includes an antenna array 12 that includes at least one transmit element 14 and an array of at least two receive elements, also referred to as a plurality of antennas 16. One or more of the receive elements or antennas 16 may also be used to both transmit a radar signal 18, and they output a detected signal 30 indicative of reflected radar signals 20 reflected by a first target object 24A or a second target object 24B in an instrumental field of view of the system 10. The transmit element 14 and the plurality of antennas 16 are illustrated as distinct elements in this example only to simplify the explanation of the system 10.

The system 10 includes a controller 26 (or processing unit) configured to output a transmit signal 28 to the transmit element 14 and configured to collect the receive signals 30 from each antenna 16, for example a first signal 30A from a first antenna 16A and a second signal 30B from a second antenna 16B. Each of the detected signals 30 correspond to the reflected radar signal 20 that was detected by one of the plurality of antennas 16. The controller 26 includes a processor 27 such as a microprocessor, digital signal processor, or other control/signal conditioning circuitry such as analog and/or digital control circuitry including an application specific integrated circuit (ASIC) for processing data. The controller 26 also includes memory (not shown), including non-volatile memory, such as electrically erasable programmable read-only memory (EEPROM) for storing one or more routines, thresholds and captured data.

Furthermore, the controller 26 includes a receiver 29 configured to receive an antenna signal (e.g., the first signal 30A and the second signal 30B) from each antenna (e.g., the first antenna 16A and the second antenna 16B) corresponding to the reflected radar signal 20 that was collected from each of the plurality of antennas 16. The controller 26 may include a mixer (not shown) and a local oscillator (not shown) in order to demodulate the detected signals 30. The mixer and the local oscillator may be part of the receiver 29.

The transmit element 14 radiates or emits the radar signal 18 toward the first target object 24A and/or to the second target object 24B in the instrumental field of view 22, and each of the plurality of antennas 16 detects a reflected radar signal reflected by the first target object 24A and/or the second target object 24B. Characteristics of the reflected radar signal 20 depend on a backscatter property or radar cross section (RCS) of the first target object 24A or the second target object 24B. The characteristics also depend on distance, direction, and relative motion of the first object 24A and/or the second object 24B relative to the antenna array 12, which influences the Doppler shift of the reflected radar signal 20.

The first target object 24A is located at a range or distance r1 with respect to the antenna array 12 of the system 10 and therefore with respect to a host vehicle (not shown) in which the system 10 is installed, whereas the second target object 24B is located at a range or distance r2 with respect to the antenna array 12 of the system 10. A relative position difference between the first target object 24A and the second target object 24B is illustrated as Δrx and Δry. In addition, the second target object 24B is located at an azimuth angle θ with respect to a longitudinal axis of the host vehicle or a normal line with respect to the antenna array 12. Because the first object 24A is aligned with this normal line, the azimuth angle is almost zero for the first object 24A and therefore not shown in FIG. 1. The focus of the method according to the disclosure is on precisely estimating the azimuth angle θ of objects in the environment of the host vehicle.

Figure 2:
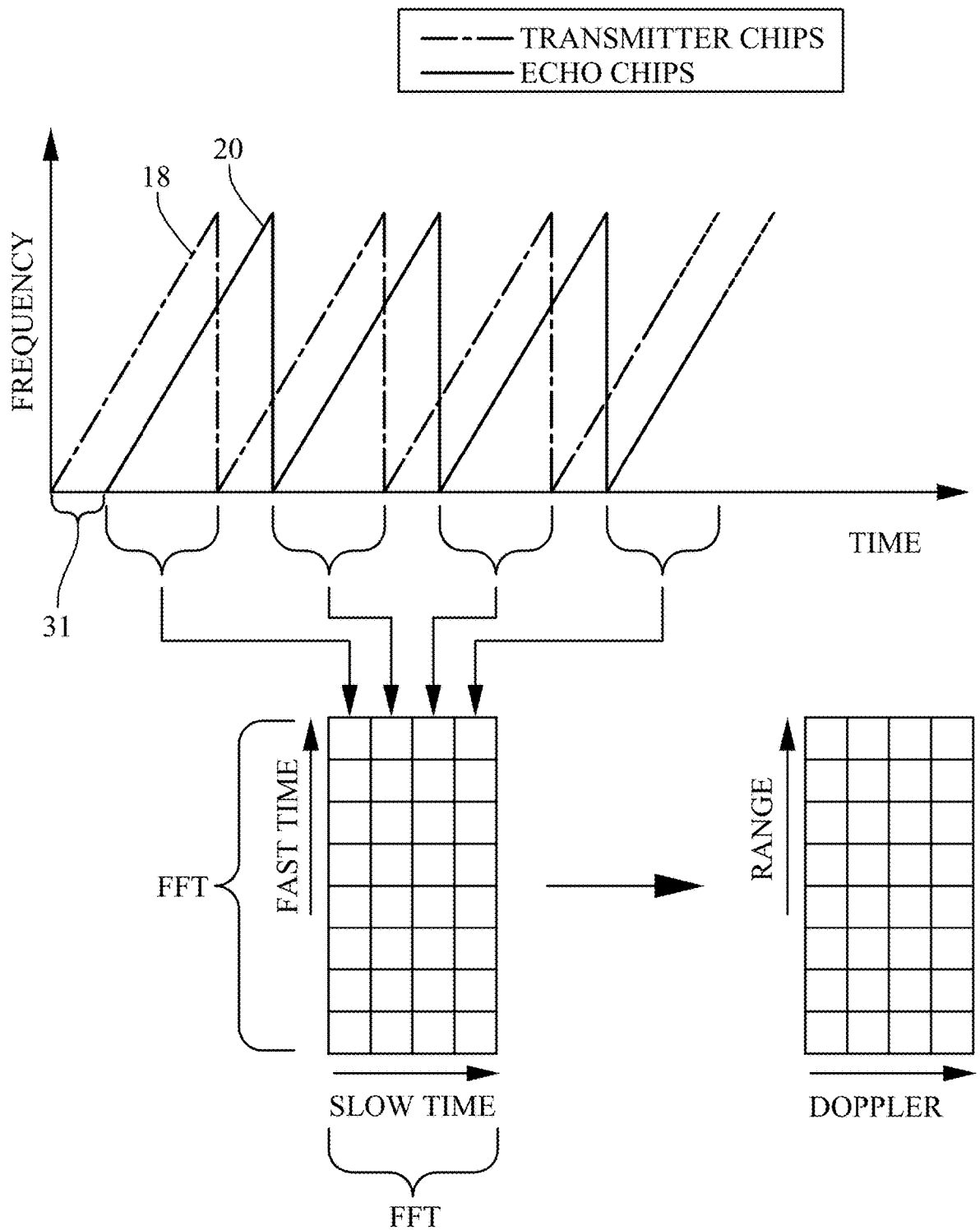
FIG. 2 depicts sent and reflected radar signals and their processing.

FIG. 2 schematically depicts the frequency of the transmitted radar signal 18 and of the reflected radar signal 20 over time and the processing of these signals according to the background art. The diagrams of FIG. 2 have been taken from Sun et al.: "MIMO Radar for Advanced Driver Assistance Systems and Autonomous Driving", IEEE Signal Processing Magazine, vol. 37, issue 4, pp. 98-117, Jul. 29, 2020. The transmitted and reflected radar signals 18, 20 have a FMCW (frequency modulated continuous wave) waveform which is also referred to as a chirp. That is, both signals include a complex sinusoid for which the frequency linearly increases within a time interval T according to $$f_T(t) = f_c + B\left(\frac{t - T/2}{T}\right), t \in [0, T] \qquad (1)$$

wherein B is the signal bandwidth and $f_c$ are a carrier frequency. For the carrier frequency, a typical frequency band of 76 to 81 GHz is used for an automotive radar system like the system 10 as shown in FIG. 1.

The reflected radar signals 20 which are also referred to as echo chirps are a delayed and attenuated copy of the transmitted signal 18 (or chirp). For a target object 24A, 24B which is located at a range R and moves with a radial speed v, the delay time 31 (see FIG. 2) is given by $$\tau = (2(R+vt))/c \qquad (2)$$

wherein the time t is running over multiple periods T of the chirp signals 18, 20, and c is the speed of light.

Usually, the reflected radar signal 20 is mixed with the transmitted signal 18 or transmitted chirp, which results in a complex sinusoid known as a beat signal. The beat signal has a frequency $f_b = f_R + f_D$, wherein $f_R = 2RB/(Tc)$ is the so-called range frequency, and $f_D = (2v/c)f_c$ is the so-called Doppler frequency.

For processing the beat signal, the time during one period or chirp is usually referred to as the fast time, while the time across multiple periods T or chirps is referred to as the slow time. When the beat signal is sampled, the samples of each chirp or antenna 16 is arranged in columns of a matrix, wherein the row indices of the matrix correspond to the fast time and the column indices correspond to the slow time, as shown in FIG. 2. Because $f_D$ is usually much smaller than $f_R$, $f_D$ may be taken as constant within each chirp. Therefore, a Fourier transform is usually applied to the sampled beat signal along the fast time for each antenna 16 (or channel), which allows to identify the respective range of the target object 24A, 24B with respect to the antenna array 12 being used as a reference point at the host vehicle. In detail, the range or distance of the objects 24A, 24B is obtained as $$R = cf_R T/(2B) \qquad (3).$$

In order to obtain the velocity of the objects 24A, 24B, a second Fourier transform is usually carried out subsequently along the slow time. The application of the first and second Fourier transform is equivalent to a two-dimensional Fourier transform of the beat signal in the fast and slow times, and the result is usually called a range-Doppler spectrum.

According to the background art, an angle estimation may be further performed based on the range-Doppler spectrum. For the angle estimation, an angle is defined with respect to a longitudinal axis of the host vehicle and is an azimuth angle and/or an elevation angle. Furthermore, the angle estimation according to the background art may be based on a further Fourier transform or on an iterative adaptive approach (IAA).

However, such an angle estimation based on the range-Doppler spectrum mostly entails high computational and/or hardware cost. In addition, there might be some ambiguities regarding the angle estimation due to sidelobes which are generated by the respective angle finding procedures. In order to overcome these disadvantages, the method according to the disclosure is based on a different approach which does not rely on the range-Doppler spectrum. After the first Fourier transform as described above over the fast time which is related to the determination of the range, the result of the first Fourier transform is rearranged such that for each range bin (i.e., the discretized range resulting from the first Fourier transform) a vector is generated which runs over all chirps or antenna channels 16 (see FIG. 1). This vector is called a long beam vector and carries the antenna information together with the Doppler information regarding the velocity of target objects.

Figure 3A:
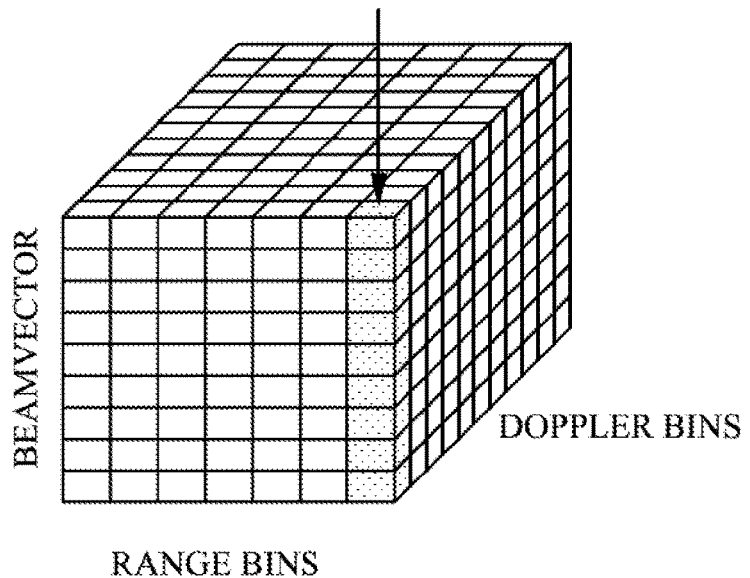
FIG. 3A depicts generating a range-Doppler spectrum, which is shown as a beam vector and FIG. 3B depict depicts generating a long beam vector.
Figure 3B:
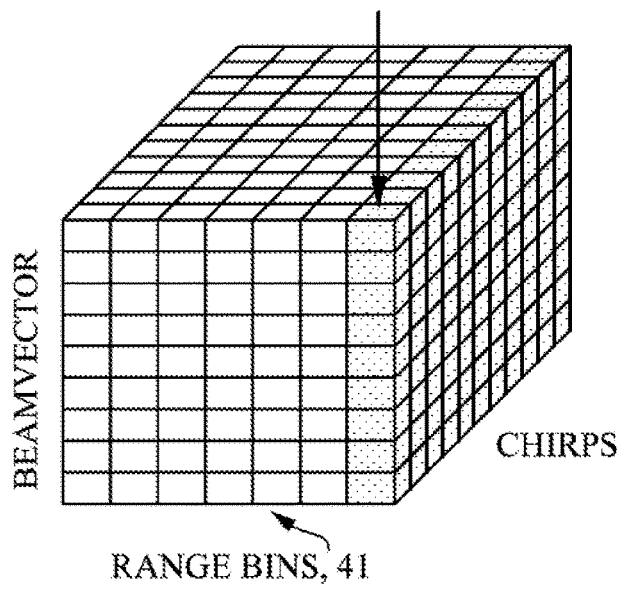

The generation of a long beam vector 43 for each range bin 41 is schematically depicted in FIG. 3B. FIG. 3A illustrates again the generation of the range-Doppler spectrum which is shown as a beam vector depending on the respective range bins and Doppler bins, in accordance with FIG. 2. The beam vector is based on the result of e.g., a two-dimensional Fourier transform over the fast and slow times performed for the beat signal as described above.

In contrast, FIG. 3B schematically depicts a corresponding beam vector after the first Fourier transform over the fast time which includes the range bins for the respective chirps or antenna channels 16 (see FIG. 1). For generating the long beam vector 43, the beam vector elements for all chirps are rearranged one after the other over all chirps in order to generate one vector which is called the long beam vector 43 and which is shown schematically in the lower part of FIG. 3B.

For the angle estimation based on the long beam vector 43, a reference vector 45 (see FIG. 4) is calculated based on a signal model which considers the motion of the target objects 24A, 24B relative to the radar system 10 (i.e., relative to the antennas 16 being installed in the vehicle) and which depends on the angle to be determined, i.e., the azimuth angle and/or the elevation angle. The concept is explained in detail for a Uniform Linear Array (ULA) and a linear relative motion of one of the target objects 24A, 24B. For more complex antenna arrangements and a more complex object motion, the signal model may be extended as is known in the background art.

The signal model is based on the following formula:

$$s(T,n;\dot{r},\theta)=ae^{-i(Tk_{\dot{r}}+nk\alpha)} \quad (4)$$

wherein T is the slow time represented by a slow time index relative to the first chirp. n is the antenna channel index relative to the first antenna 16A (see FIG. 1). $\dot{r}$ is the range rate of the respective target object 24A, 24B in m/s. α is an electric angle which is defined for an interval from −1 to +1, wherein α=sin θ, and θ is the mechanical angle to be determined in rad, with θ=0 defining a boresight, and is a complex amplitude. The respective coefficients k are defined by the following formulas:

$$k_{\dot{r}} = \frac{2\pi}{\lambda}\dot{r}2T_{chirp} \quad (5)$$

$$k_\alpha = \frac{2\pi}{\lambda}\alpha 2T_{Space}$$

wherein $T_{chirp}$ is a doppler sampling period in s or chirp period, and $T_{Space}$ is a spatial sampling period in m which corresponds to the spacing of the antennas 16. The factor of 2 which is included in the formulas for the coefficients is due to the two-way propagation of the radar signals, i.e., from the respective antenna 16 to one of the target objects 24A, 24B and back (see FIG. 1).

Figure 4:
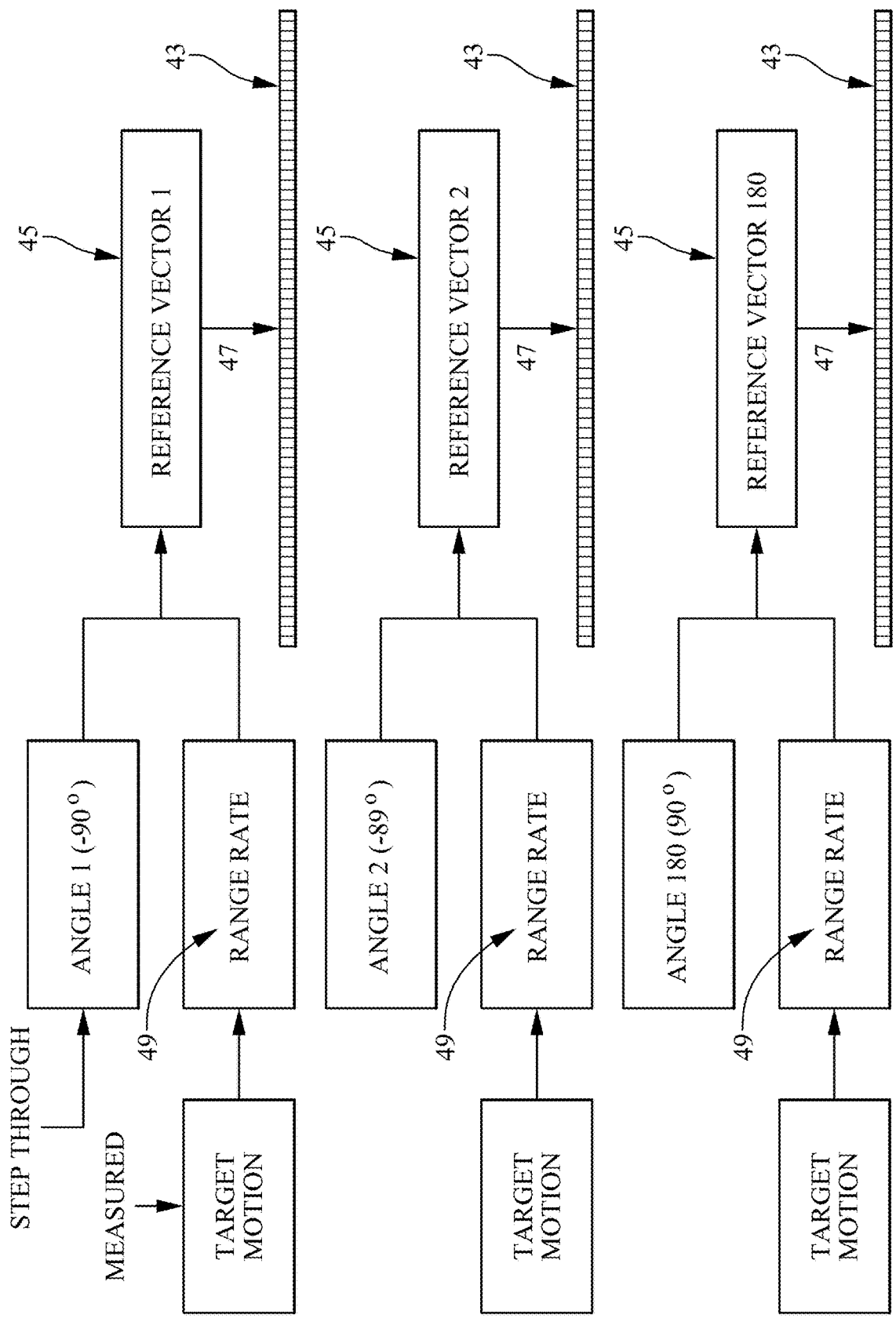
FIG. 4 depicts a diagram for generating reference vectors based on a signal model and for correlating these with a long beam vector, and FIGS. 5A-5C compare the results of the method according to the disclosure with results according to the background art.

The method steps for generating reference vectors depending on the angle θ and correlating the reference vectors with the long beam vector 43 are depicted schematically in FIG. 4. The angle θ is used as a parameter and is defined for a predetermined angle range. For the present example, the angle range extends from −90° to +90°, and the angle θ is varied in steps of one degree. That is, 181 reference vectors are generated based on the signal model in order to cover the entire angle range. In order to calculate the respective reference vector 45, the range rate of the target object 24A, 24B has to be given from a further measurement. The relative motion of the target object may be determined via a further measurement device or detection unit installed in the host vehicle or may rely on a former measurement performed by the radar system as shown in FIG. 1 for which the further Fourier transform based on the slow time is performed in order to determine the velocity.

Based on the given range rate or velocity 49 of the respective target object 24A, 24B and based on the pre-set angle θ as a parameter, elements of the respective reference vector 45 are calculated which correspond to the respective elements of the long beam vector 43.

For each angle step as shown in FIG. 4, the respective reference vector 45 is correlated with the long beam vector 43. This correlation is indicated by 47 in FIG. 4. The correlation is performed by calculating the inner product of the respective reference vector 45 with the long beam vector 43, i.e., by multiplying pairs of corresponding elements and summing-up all products of the respective elements. The result of this correlation provides a value for the respective angle or angle bin, i.e., for discretized angle steps which run from −90° to +90° for the present example.

Figure 5A:
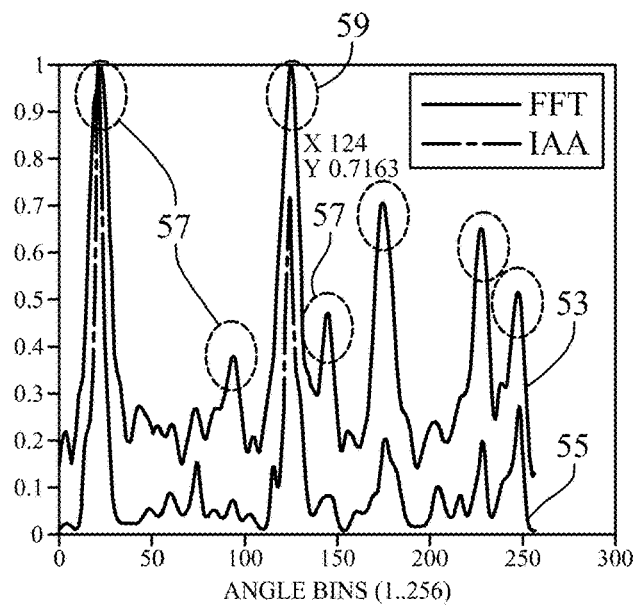
Figure 5B:
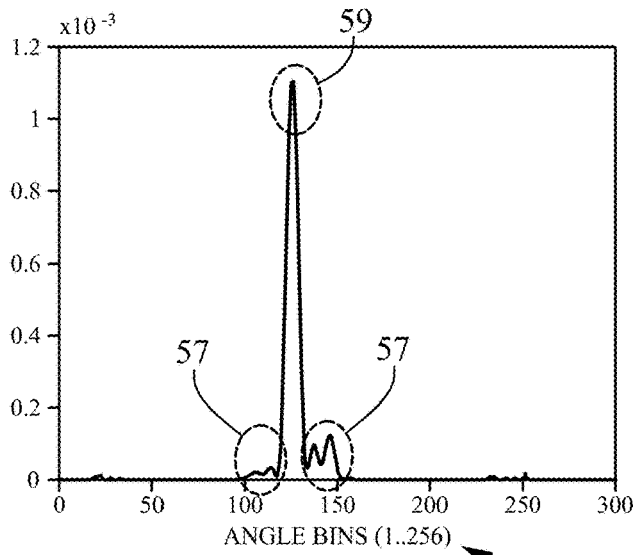

The entire result for correlating the long beam vector 43 and the reference vectors 45 over all angle bins 51 is depicted in FIG. 5B, wherein the angle bins are represented on the x-axis, whereas the correlation result is represented by the y-axis. Regarding FIG. 5B, it is noted that 256 angle bins cover the angle range from −90° to +90° to provide a greater angle resolution than for the schematic illustration of FIG. 4 for which 180 steps of one degree have been assumed.

Figure 3B:
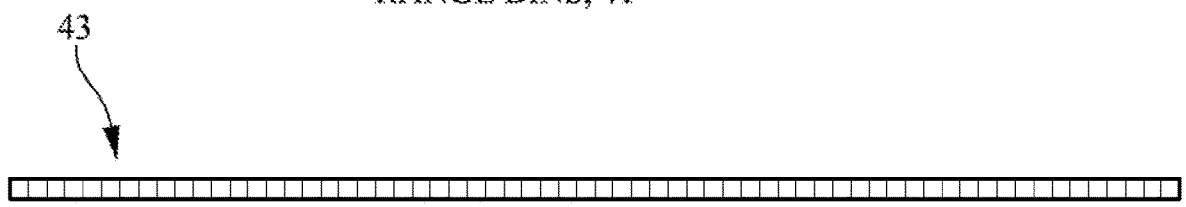

The iteration of the angle θ over the predefined angle range is performed for each range bin 41 (see FIG. 3) separately. That is, a diagram like FIG. 5B representing the correlation result for the long beam vector 43 and the reference vectors 45 can be plotted for each range bin 41. In FIG. 5B, the angle θ to be determined for the respective range bin 41 is given by the maximum 59 of the correlation curve which is located at angle bin 128 corresponding approximately to boresight, i.e., 0 degrees.

In order to reduce the computational time required for performing the method according to the disclosure, respective regions of interest may be predefined for the angle θ and for the range or distance of the target objects 24A, 24B. Such regions of interest may be based on the detection of the target motion being performed by further systems of the host vehicle which also provide e.g., the range rate or velocity 49.

In FIG. 5A the results of two classical angle finding procedures are shown which are based on the range-Doppler spectrum as described above. Curve 53 represents the result of the angle finding via a further Fourier transform, whereas curve 55 represents the result of an iterative adaptive approach (IAA) as known in the background art. While one maximum of both curves 53, 55 occurs at the correct angle of approximately 0 degrees (angle bin 128), both curves include many additional maxima and strong sidelobes which are indicated by 57. This complicates a proper angle estimation based on the result according to the background art as shown in FIG. 5A, which especially holds true for the angle estimation based on the further Fourier transform.

Although the sidelobes 57 are reduced for the angle finding via IAA, the curve 55 also includes a strong maximum at small angles. Hence, FIG. 5A demonstrates the ambiguities which may occur if the angle finding procedures according to the background art are applied.

In contrast, FIG. 5B depicts the result of the correlation of the long beam vector 43 with the reference vectors 45 over all angle bins. The sidelobes as indicated at 57 are strongly suppressed in comparison to FIG. 5A. In addition, the maximum as shown at 59 in FIG. 5B relies on a peak which has a smaller width, especially in comparison to the result of angle finding by the Fourier transform as shown in FIG. 5A.

Figure 5C:
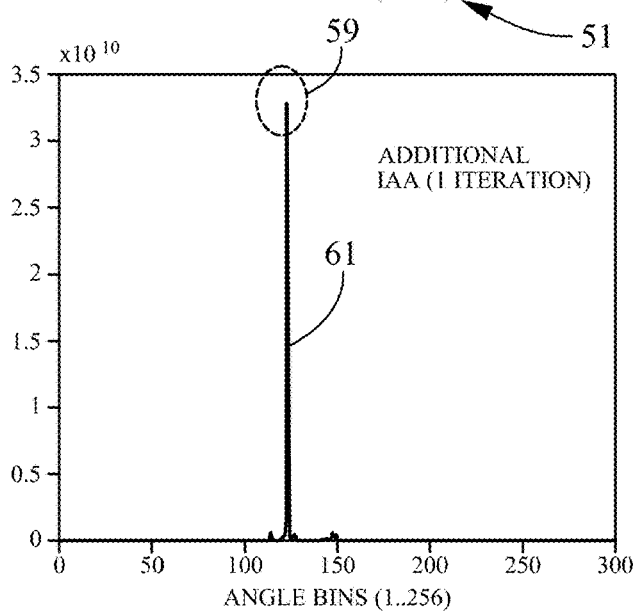

For the curve 61 as shown in FIG. 5C, an additional angle finding procedure has been applied in addition to the correlation of a long beam vector from the curve 53 and the reference vectors according to FIG. 4 and FIG. 5B. In detail, an additional iterative adaptive approach (IAA) has been applied to the correlation result. As can be recognized in FIG. 5C, the sidelobes 57 are additionally suppressed, and the width of the peak indicating the correct maximum for the angle θ is also strongly reduced, as can be recognized at 59. Hence, the angular resolution of the method is enhanced by the additional angle finding procedure as shown in FIG. 5C, in addition to further reducing the ambiguities due to sidelobes.

What is claimed is:

1. A method comprising:
   estimating an angle of a target object with respect to a host vehicle by:
   sending, with at least one radar transmit element of a plurality of antenna transmit elements of a radar system of the host vehicle, a radar signal towards the target object;
   receiving, with at least one antenna receiver element of a plurality of receive elements of the radar system, radar signals reflected by the target object;
   calculating, via a processing unit of the host vehicle, a transformation of the reflected radar signals including a result of the transformation that depends on a range with respect to the host vehicle;
   generating, via the processing unit and for each of a set of range bins provided by the transformation, a long beam vector by rearranging the result of the transformation including rearranging beam vector elements for chirps of the reflected radar signals such that the long beam vector comprises elements of the transformation from all receiver elements, wherein each entry of the long beam vector corresponds to one of the range bins in the set of range bins;
   calculating, via the processing unit and for each range bin in the set of range bins, a reference vector based on a signal model that depends on a motion of the target object relative to the radar system and that is parameterized regarding the angle of the target object, wherein each of the reference vectors is calculated based on i) a range rate or velocity of the target object relative to the radar system, and ii) a respectively selected angle in a predefined range of angles; and
   determining a correlation result by correlating, via the processing unit, the long beam vector and the reference vectors for the predefined range of angles; and
   outputting, via the processing unit, the angle of the target object determined based on the correlation result for controlling the host vehicle.

2. The method according to claim 1, wherein the transformation of the reflected radar signals includes a Fourier transform.

3. The method according to claim 1, wherein determining the correlation result comprises calculating an inner product of the long beam vector and each of the reference vectors.

4. The method according to claim 1, wherein determining the angle of the target object comprises finding at least one maximum of the correlation result.

5. The method according to claim 1, wherein:
   a region of interest is defined for the range of angles; and
   the correlation result is determined for the region of interest only.

6. The method according to claim 1, further comprising applying an additional angle finding procedure to the correlation result to determine the angle of the target object.

7. The method according to claim 6, wherein the additional angle finding procedure is based on an iterative adaptive approach.

8. The method according to claim 1, wherein the motion of the target object relative to the radar system is measured by an additional detection unit installed in the host vehicle.

9. The method according to claim 1, further comprising deriving, from former measurements performed via the radar system, information regarding the motion of the target object relative to the radar system.

10. The method of claim 1, wherein each of the reference vectors has a same number of entries as the long beam vector.

11. The method of claim 1, wherein the predefined range of angles is −90° to +90°.

12. The method of claim 11, wherein:
   the long beam vector and the reference vectors are correlated for a plurality of values of the angle θ; and
   the angle θ is varied in steps of one degree over the predefined range of angles of −90° to +90°.

13. A system comprising a processing unit configured to:
   estimate an angle of a target object with respect to a host vehicle by
   sending, with at least one radar transmit element of a plurality of antenna transmit elements of a radar system of the host vehicle, a radar signal towards the target object
   receiving, with at least one antenna receiver element of a plurality of receive elements of the radar system, radar signals reflected by the target object,
   calculating a transformation of the reflected radar signals including a result of the transformation that depends on a range with respect to the host vehicle,
   generating, for a set of range bins provided by the transformation, a long beam vector by rearranging the result of the transformation including rearranging beam vector elements for chirps of the reflected radar signals such that the long beam vector comprises elements of the transformation from all receiver elements, wherein each entry of the long beam vector corresponds to one of the range bins in the set of range bins,
   calculating, for each range bin in the set of range bins, a reference vector based on a signal model that depends on a motion of the target object relative to the radar system and that is parameterized regarding the angle of the target object, wherein each of the reference vectors is calculated based on i) a range rate or velocity of the target object relative to the radar system, and ii) a respectively selected one of a predefined range of angles, and determining a correlation result by correlating the long beam vector and the reference vector for the predefined range of angles; and output the angle of the target object determined based on the correlation result for controlling the host vehicle.

14. The system according to claim 13, wherein the transformation of the reflected radar signals includes a Fourier transform.

15. The system according to claim 13, wherein the processing unit is configured to determine the correlation result by calculating an inner product of the long beam vector and each of the reference vectors.

16. The system according to claim 13, wherein the processing unit is configured to determine the angle of the target object by finding at least one maximum of the correlation result.

17. The system according to claim 13, wherein:
a region of interest is defined for the range of angles; and
the correlation result is determined for the region of interest only.

18. The system according to claim 13, wherein the processing unit is further configured to apply an additional angle finding procedure to the correlation result to determine the angle of the target object.

19. The system according to claim 18, wherein the additional angle finding procedure is applied using an iterative adaptive approach.

20. The system according to claim 13, wherein the motion of the target object relative to the radar system is measured by an additional detection unit installed in the host vehicle.

21. The system according to claim 13, wherein the processing unit is further configured to derive, from former measurements performed via the radar system, information regarding the motion of the target object relative to the radar system.

22. The system according to claim 13, further comprising at least one of:
the radar system of the host vehicle; or
the host vehicle.

23. A non-transitory computer readable medium comprising instructions that, when executed, cause a processing unit to:
estimate, using a radar system of a host vehicle, an angle of a target object with respect to the host vehicle by:
sending, with at least one radar transmit element of a plurality of antenna transmit elements of the radar system of the host vehicle, a radar signal towards the target object;
receiving, with at least one antenna receiver element of a plurality of receive elements of the radar system, radar signals reflected by the target object;
calculating a transformation of the reflected radar signals including a result of the transformation that depends on a range with respect to the host vehicle;
generating, for each range bin in a set of range bins provided by the transformation, a long beam vector by rearranging the result of the transformation including rearranging beam vector elements for chirps of the reflected radar signals such that the long beam vector comprises elements of the transformation from all receiver elements, wherein each entry in the long beam vector corresponds to one of the range bins in the set of range bins;
calculating, for each range bin in the set of range bins, a reference vector based on a signal model that depends on a motion of the target object relative to the radar system and that is parameterized regarding the angle of the target object, wherein each of the reference vectors is calculated based on i) a range rate or velocity of the target object relative to the radar system, and ii) a respectively selected one of a predefined range of angles; and
determining a correlation result by correlating the long beam vector and the reference vector for the predefined range of angles; and
output the angle of the target object determined based on the correlation result for controlling the host vehicle.

* * * * *

UNITED STATES PATENT AND TRADEMARK OFFICE
CERTIFICATE OF CORRECTION

PATENT NO. : 12,292,496 B2
APPLICATION NO. : 17/650514
DATED : May 6, 2025
INVENTOR(S) : Wolfgang Doerr et al.

Page 1 of 1

It is certified that error appears in the above-identified patent and that said Letters Patent is hereby corrected as shown below:

In the Claims

Column 11, Claim 1, Line 43: after "for", delete "each of"

Signed and Sealed this
Eighth Day of July, 2025

Coke Morgan Stewart
*Acting Director of the United States Patent and Trademark Office*